US009135625B1

(12) United States Patent
Yuksel et al.

(10) Patent No.: US 9,135,625 B1
(45) Date of Patent: *Sep. 15, 2015

(54) SYSTEMS AND METHODS OF DETECTING KEYWORD-STUFFED BUSINESS TITLES

(71) Applicant: Google Inc., Mountain View, CA (US)

(72) Inventors: Baris Yuksel, New York, NY (US); Lev Ratinov, New York, NY (US)

(73) Assignee: Google Inc., Mountain View, CA (US)

( * ) Notice: Subject to any disclaimer, the term of this patent is extended or adjusted under 35 U.S.C. 154(b) by 321 days.

This patent is subject to a terminal disclaimer.

(21) Appl. No.: 13/890,821

(22) Filed: May 9, 2013

Related U.S. Application Data

(63) Continuation of application No. 12/959,783, filed on Dec. 3, 2010, now Pat. No. 8,473,491.

(51) Int. Cl.
  *G06F 17/30* (2006.01)
  *G06Q 30/00* (2012.01)
(52) U.S. Cl.
  CPC ...... *G06Q 30/0185* (2013.01); *G06F 17/30528* (2013.01)
(58) Field of Classification Search
  CPC ................ G06Q 30/0185; G06F 17/20528
  See application file for complete search history.

(56) References Cited

U.S. PATENT DOCUMENTS

| 8,171,020 | B1 | 5/2012 | Kacholia et al. |
| 2004/0083127 | A1 | 4/2004 | Lunsford et al. |
| 2006/0069667 | A1 | 3/2006 | Manasse et al. |
| 2006/0184500 | A1 | 8/2006 | Najork et al. |
| 2008/0133488 | A1 | 6/2008 | Bandaru et al. |
| 2011/0029467 | A1 | 2/2011 | Spehr et al. |

FOREIGN PATENT DOCUMENTS

KR  100742130 B1  7/2007

*Primary Examiner* — James Trujillo
*Assistant Examiner* — Kurt Mueller
(74) *Attorney, Agent, or Firm* — Lerner, David, Littenberg, Krumholz & Mentlik, LLP

(57) ABSTRACT

The present invention relates generally to identifying fraudulent businesses and business listings. More specifically, the invention relates to determining a "surprisingness" value for a particular combination of words in a business title based on the likelihood that the combination has appeared in legitimate business titles. The value may be used to determine whether the business or business listing is legitimate or fraudulent. For example, third party hijackers may "keyword-stuff" business titles or attempt to include words associated with prominent businesses in a title of a less prominent business associated with the third party in order to have the less prominent business displayed more often in search results for the prominent business. For example, if a business title has too many surprising word combinations or a particular combination is highly unlikely, the business listing is likely to be fraudulent or "keyword-stuffed" and may be withheld, excluded, removed from search results.

18 Claims, 9 Drawing Sheets

Term co-occurrence matrix

- Noon&Kebab [Persian cuisine, Restaurant]
- Moonstruck [Chocolate bar, Coffee shop]
- Dolly Bar&Grill [Restaurant, Persian food]
- Big Mouth [Fast food, Hotdog joint, Grill, Restaurant]

|  | Restaurant | Bar | Cuisine | Food | Grill | Coffee |
|---|---|---|---|---|---|---|
| Restaurant |  | 1 | 1 | 2 | 2 |  |
| Bar | 1 |  |  | 1 | 1 | 1 |
| Cuisine | 1 |  |  |  |  |  |
| Food | 2 | 1 |  |  | 2 |  |
| Grill | 2 | 1 |  | 2 |  |  |
| Coffee |  | 1 |  |  |  |  |

FIGURE 7

Normalized Word Co-occurrence (Surprisingness) Matrix Values

| Locksmith | Value |
|---|---|
| Guest | 0.88 |
| Margarita | 0.88 |
| Reception | 0.88 |
| Steakhouses | 0.88 |
| Cafe | 0.91 |
| Frozen | 0.94 |
| Hall | 0.95 |
| Autozone | 1.0 |
| Deli | 1.0 |

| Locksmiths | Value |
|---|---|
| Subway | 0.90 |
| Seafood | 0.90 |
| Banquet | 0.90 |
| Deli | 1.0 |

FIGURE 8

SYSTEMS AND METHODS OF DETECTING KEYWORD-STUFFED BUSINESS TITLES

CROSS-REFERENCE TO RELATED APPLICATIONS

The present application is a continuation of U.S. patent application Ser. No. 12/959,783 filed on Dec. 3, 2010, the disclosure of which is incorporated herein by reference.

BACKGROUND OF THE INVENTION

Various network-based search applications allow users to enter one or more search terms and in response, receive a list of search results. These systems use numerous different types of ranking algorithms to ensure that both the search results are relevant to the user's query and displayed in a useful way. For example, some systems such as Google Search and Google Map Search rank results based on reliability and safety of the search result, location of the user, etc. In addition, business listings included in search results may be ranked and displayed according to the prominence of the business. For example if the system may determine that the user is searching for a business, the search application may also display a list of prominent (or well known, respected or important) businesses based on the user's location.

Some third parties may attempt to defraud these services in order to misdirect users towards unrelated or fraudulent web sites. Some third parties may submit fake business information to the services by "keyword-stuffing". For example, a third party hijacker (or a hijack spammer) is a third party that tries to get a particular business identified or associated with another highly prominent business such that the particular business's listing or information is displayed prominently in a list of search result. The highly prominent business may be completely unrelated to the particular business. These hijackers may target important businesses, such as well known restaurants or hotels, and include information about the important business's contact information (such as a phone number) into listing data associated with the particular business. Where the hijacker has inserted the prominent business's title (name) into the title or content of the particular business' listing, the business listing may be considered fraudulent or "keyword-stuffed". As a result, the particular business's information is identified by these map or web search services, which may associate the particular business listing with the more prominent business and thus display the particular business' listing or information more often in search results which legitimately include the prominent business. For example, FIG. 9 demonstrates a keyword-stuffed business listing where a user has entered the search terms 910, "courtyard 4422 y st marriott sacramento" into a map search. The search results include a business listing 920 for "$28 Locksmith Sacramento." Assuming the search was looking for a hotel, this business listing would be considered unrelated. However has appeared because the business has included references 930, such as user reviews, the name and address of a Courtyard by Marriott. It is important to note that while the particular business listing is fraudulent or "keyword stuffed", the particular business itself may or may not be a legitimate business.

Current techniques for identifying fraud include searching for particular words or using language models to identify spam emails or fraudulent meta data in web pages. For example, machine learning classifiers may be trained to identify differences between spam emails and good (non-spam) emails. Some systems may allow users to keep track of "trusted" senders. If a sender is "trusted" the emails received from the sender would also be trusted and not treated as spam. In another example, machine learning classifiers may be trained to identify differences between spam web pages and good web pages, for example by examining the age and contents of the web page.

BRIEF SUMMARY OF THE INVENTION

The present invention relates generally to identifying fraudulent or "keyword stuffed" businesses titles and business listings. More specifically, the invention relates to determining a "surprisingness" value for a particular combination of words in a business title based on the likelihood that the combination has appeared in legitimate business titles. The value may be used to determine whether the business or business listing is legitimate or fraudulent. For example, if a business name has too many surprising word combinations or a particular combination is highly unlikely, the business listing is likely to be fraudulent or "keyword stuffed" and may be withheld, excluded, or removed from search results.

An aspect of the invention provides computer-implemented method of determining whether a business listing is legitimate. The method includes accessing, by a processor, a list of legitimate business titles, each legitimate business title including one or more words; the processor generating a matrix of surprisingness values based on the number of times two words occur together in the list of legitimate business titles; storing the matrix in memory; accessing a plurality of business listings each associated with title data including one or more words; selecting a particular business listing of the plurality of business listings; determining a surprisingness value indicative of the surprisingness of the title included in the particular business listing based on the matrix stored in the memory; and determining whether the particular business listing is legitimate based on whether the surprisingness value is less than a threshold value.

In one example, the method also includes normalizing the matrix before determining the surprisingness value. In another example, the method also includes associating the surprisingness value with the particular business listing. In another example, the method also includes determining that the particular business listing is fraudulent if the surprisingness value does not satisfy the threshold value.

Another aspect of the invention provides a computer-implemented method of determining whether a business listing is legitimate. The method includes accessing, by a processor, a list of legitimate business titles, each legitimate business title including one or more words; the processor generating a matrix of surprisingness values based on the number of times two words occur together in the list of legitimate business titles; storing the matrix in memory; accessing a first plurality of business listings each associated with title data including one or more words; identifying, from the first plurality of business listings, a second plurality of business listings all corresponding to one particular business; for each business listing of the identified second plurality of business listings, determining a surprisingness value indicative of the surprisingness of the title included in the particular business listing based on the stored matrix; determining an average surprisingness value for the identified second plurality of business listings; selecting a particular business listing of the identified second plurality of business listings; and determining whether the particular business listing is legitimate based on whether the surprisingness value for the particular business listing is less than the average surprisingness value plus a threshold value.

In one example, the method further includes normalizing the matrix before determining the surprisingness values for each business listing of the identified second plurality of business listings. In another example, the method further includes associating each the surprisingness value with each business listing of the identified second plurality of business listings. In another example, the method further includes determining that the particular business listing is fraudulent if the surprisingness value for the particular business listing is greater than or equal to the average surprisingness value plus a threshold value. In another example, the method further includes, determining whether the particular business listing is legitimate if the surprisingness value for the particular business listing is less than the average surprisingness value plus the threshold value.

Another aspect of the invention provides a computer-implemented method of providing search results. The method includes accessing, by a processor, a list of legitimate business titles, each legitimate business title including one or more words; the processor generating a matrix of surprisingness values based on the number of times two words occur together in the list of legitimate business titles; receiving a request for information from a client device; identifying a plurality of search results including a business listing including a title of two or more words; determining a surprisingness value indicative of the surprisingness of the title of two or more words based on the matrix; and transmitting to the client device the business listing based on a comparison of the surprisingness value and a threshold value.

In one example, the method also includes normalizing the matrix before determining the surprisingness value; and storing the matrix in memory. In another example, the method further includes associating the surprisingness value with the business listing. In another example, the method further includes transmitting the search results without including the business listing to the client device if the surprising-ness value is greater than or equal to the threshold value. In another example, the method further includes transmitting to the client device the plurality of search results including the business listing if the surprising-ness value is less than the threshold value.

A further aspect of the invention provides a method of determining whether a business listing is legitimate. The method includes accessing, by a processor, a list of legitimate business titles, each legitimate business title including one or more words; the processor generating a matrix of surprisingness values based on the number of times two words occur together in the list of legitimate business titles; storing the matrix in memory; receiving a request for information from a client device; identifying a plurality of search results including two or more business listings including a title of two or more words; for each business listing of the two or more business listings, determine a surprisingness value indicative of the surprisingness of the title included in the particular business listing based on the stored matrix; determining an average surprisingness value for the two or more business listings; selecting one business listing of the two or more business listings; and determining whether the one business listing is legitimate based on whether the surprisingness value for the particular business listing is less than the average surprisingness value plus a threshold value.

In one example, the method also includes normalizing the matrix before determining the surprisingness values for each business listing of the identified second plurality of business listings. In another example, the method also includes transmitting the search results without including the particular business listing to the client device if the surprisingness value for the particular business is greater than or equal to the threshold value. In another example, the method also includes transmitting to the client device the plurality of search results including the particular business listing if the surprisingness value for the particular business is less than the threshold value.

Yet another aspect of the invention provides a computer. The computer includes memory and a processor coupled to the memory. The processor is operable to access a list of legitimate business titles stored in the memory, each legitimate business title including one or more words; generate a matrix of surprisingness values based on the number of times two words occur together in the list of legitimate business titles; store the matrix in the memory; access a plurality of business listings stored in the memory, each business listing of the plurality of business listings associated with title data including one or more words; select a particular business listing of the plurality of business listings; determine a surprisingness value indicative of the surprisingness of the title included in the particular business listing based on the matrix stored in the memory; and determine whether the particular business listing is legitimate based on whether the surprisingness value is less than a threshold value.

In one example, the processor is also operable to determine that the particular business listing is fraudulent if the surprisingness value does not satisfy the threshold value.

Further, each of the aforementioned methods and examples herein may be implemented by a computer including a processor and memory coupled to the processor. The memory stores information accessible by the processor, including instructions that may be executed by the processor to perform the aforementioned actions.

BRIEF DESCRIPTION OF THE DRAWINGS

FIG. 7 is an exemplary term co-occurrence matrix in accordance with an aspect of the invention.

FIG. 8 is an exemplary surprisingness matrix in accordance with an aspect of the invention.

DETAILED DESCRIPTION

Figure 1:
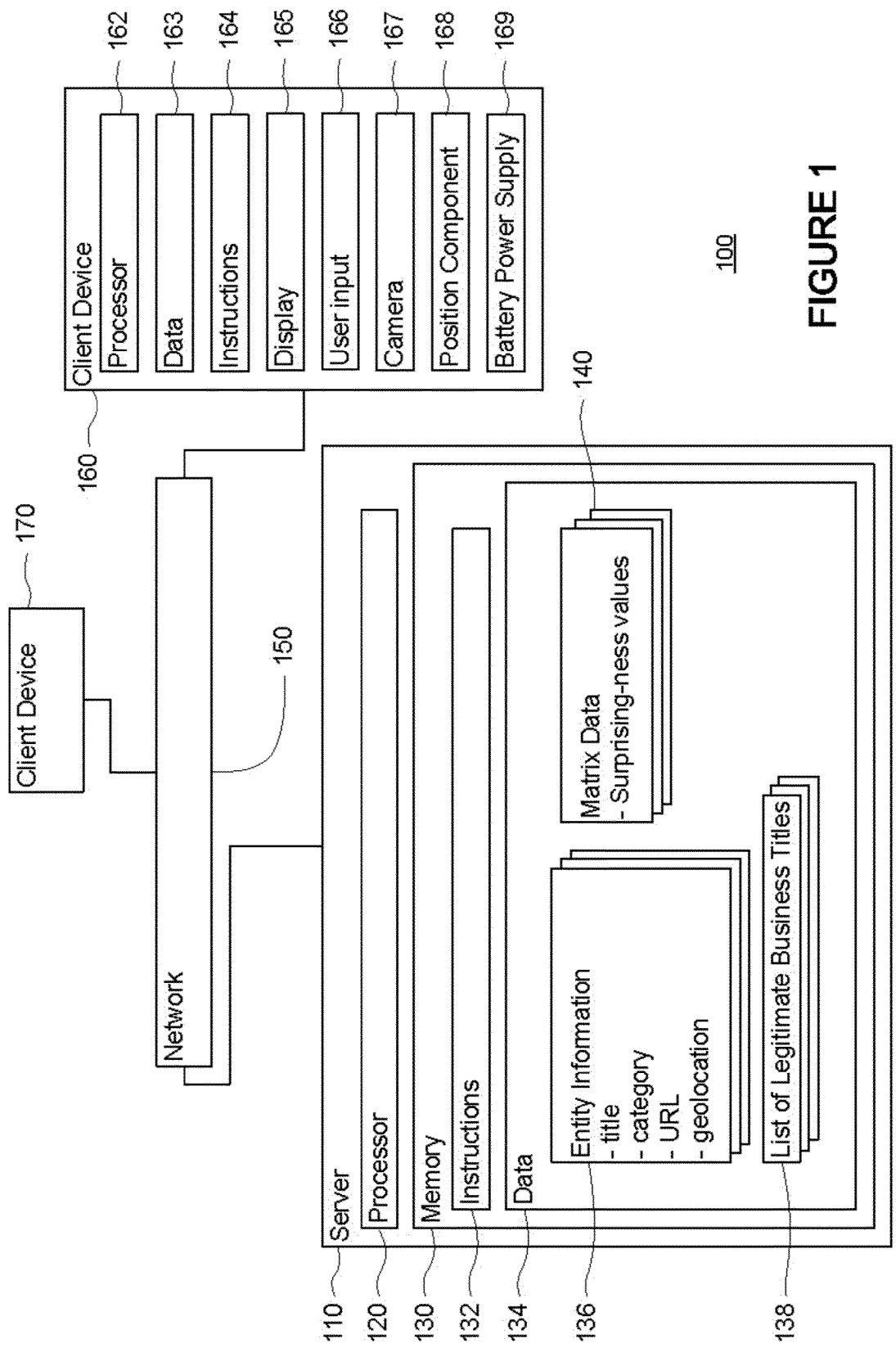
FIG. 1 is a functional diagram of a system in accordance with an aspect of the invention.
Figure 2:
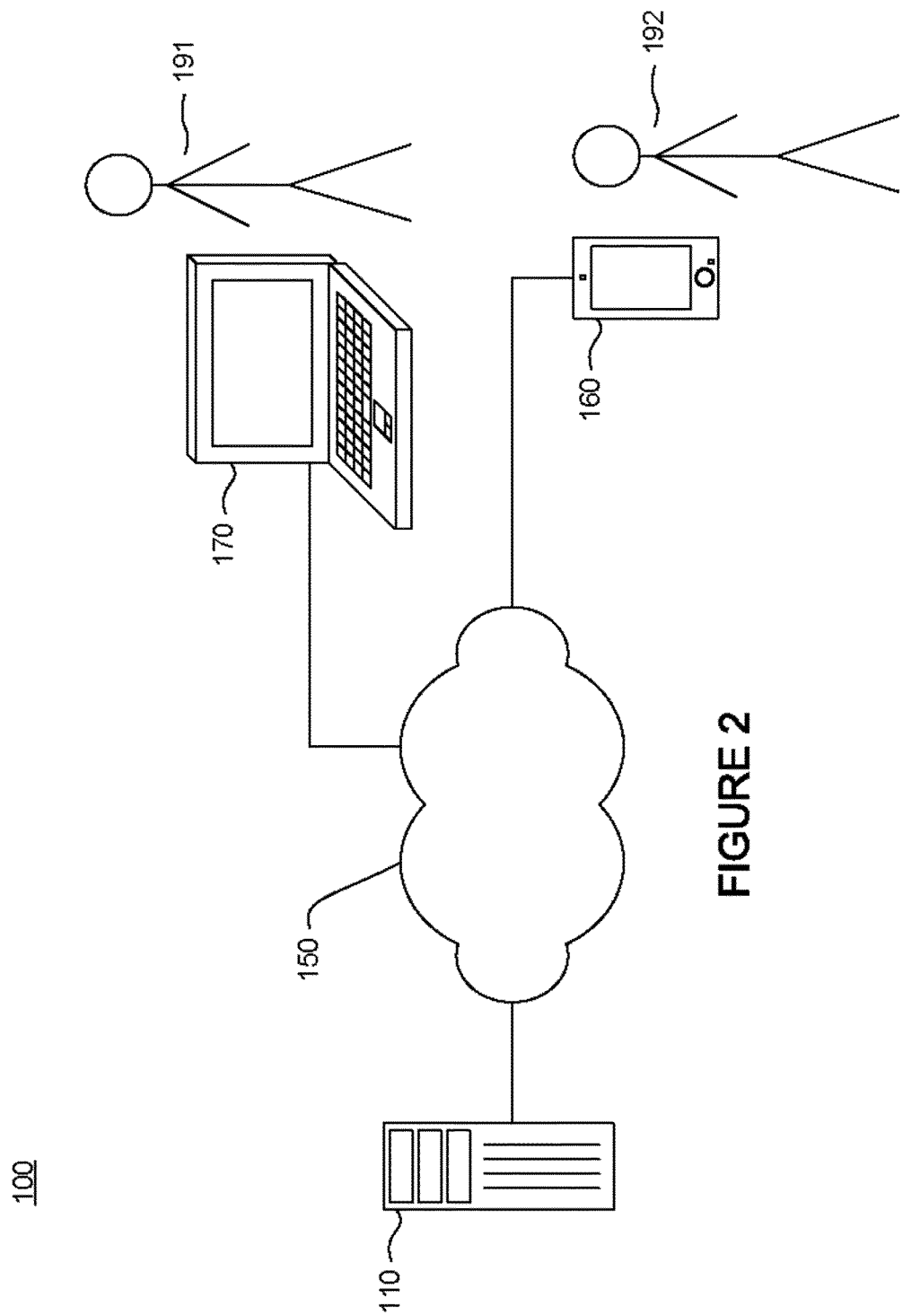
FIG. 2 is a pictorial diagram of a system in accordance with an aspect of the invention.

As shown in FIGS. 1-2, a system 100 in accordance with one aspect of the invention includes a computer 110 containing a processor 120, memory 130 and other components typically present in general purpose computers.

The memory 130 stores information accessible by processor 120, including instructions 132, and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, flash drive, ROM, RAM, DVD or other optical disks, as well as other write-capable and read-only memories. In that regard, memory may include short term or temporary storage as well as long term or persistent storage. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the architecture is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless or lossy, and bitmap or vector-based, as well as computer instructions for drawing graphics. The data may comprise any information sufficient to identify the relevant information, such as numbers, descriptive text, proprietary codes, references to data stored in other areas of the same memory or different memories (including other network locations or servers) or information that is used by a function to calculate the relevant data.

The processor 120 may be any conventional processor, such as processors from Intel Corporation or Advanced Micro Devices. Alternatively, the processor may be a dedicated controller such as an ASIC. Although FIG. 1 functionally illustrates the processor and memory as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor or computer will be understood to include references to a collection of processors or computers or memories that may or may not operate in parallel.

The computer 110 may be at one node of a network 150 and capable of directly and indirectly receiving data from other nodes of the network. For example, computer 110 may comprise a web server that is capable of receiving data from client devices 160 and 170 via network 150 such that server 110 uses network 150 to transmit and display information to a user on display 165 of client device 170. Server 110 may also comprise a plurality of computers that exchange information with different nodes of a network for the purpose of receiving, processing and transmitting data to the client devices. In this instance, the client devices will typically still be at different nodes of the network than any of the computers comprising server 110.

Network 150, and intervening nodes between server 110 and client devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIGS. 1-2, it should be appreciated that a typical system can include a large number of connected computers.

Each client device may be configured similarly to the server 110, with a processor, memory and instructions as described above. Each client device 160 or 170 may be a personal computer intended for use by a person 191-192, and have all of the components normally used in connection with a personal computer such as a central processing unit (CPU) 162, memory (e.g., RAM and internal hard drives) storing data 163 and instructions 164, an electronic display 165 (e.g., a monitor having a screen, a touch-screen, a projector, a television, a computer printer or any other electrical device that is operable to display information), end user input 166 (e.g., a mouse, keyboard, touch-screen or microphone). The client device may also include a camera 167, position component 168, accelerometer, speakers, a network interface device, a battery power supply 169 or other power source, and all of the components used for connecting these elements to one another.

Although the client devices 160 and 170 may each comprise a full-sized personal computer, they may alternatively comprise mobile devices capable of wirelessly exchanging data with a server over a network such as the Internet. By way of example only, client device 160 may be a wireless-enabled PDA or a cellular phone capable of obtaining information via the Internet. The user may input information using a small keyboard (in the case of a Blackberry-type phone), a keypad (in the case of a typical cellular phone) or a touch screen (in the case of a PDA).

Data 134 may include entity information 136. This information includes various business or other listings. The entity information may be compiled from a plurality of data providers, such as business listing websites (yellow pages), government web sites, etc. An listing may be associated with a name or title (such as "Tom's Pizzaria"), a category (such as "pizza", "Italian restaurant" or "ballpark"), a geographic location (such as "123 Main Street" or latitude and longitude), and various other types of information such as links to the entity's website, user reviews, images, phone numbers, links to additional information pages, etc. While the examples below relate generally to "business" listings it will be understood that the systems and methods described may be used with all types of listings, such as for example, government listings, clubs, monuments, and other geolocated objects. Thus, these items (or various combinations of these items) may also be considered "business listings" as used herein.

The server may also have access to a list of known legitimate business titles. This list of known legitimate businesses may be manually selected in order to be used as a seed list to identify fraudulent business titles as described below.

Data 134 may also include matrix data 140. The matrix data may include one or more word co-occurrence matrixes which detail the probability that a particular word in a title will occur with one or more other words in the same title. FIG. 7 demonstrates an exemplary co-occurrence matrix 700 for a list of exemplary business listings 710. As shown in the example, the word "cuisine" occurs in combination with restaurant in the "Noon&Kebab" listing, while the word "restaurant" occurs with the word "food" in both the "Dolly Bar&Grill" and the "Big Mouth" listing. Accordingly, in matrix 700, the combinations restaurant/cuisine and restaurant/food have 1 and 2 entries, respectively. As will be described in detail below, the matrix data may be used to determine surprisingness values for business titles.

In addition to the operations described below and illustrated in the figures, various operations in accordance with aspects of the invention will now be described. It should also be understood that the following operations do not have to be performed in the precise order described below. Rather, various steps can be handled in a different order or simultaneously.

The server may access the list of known prominent businesses in order to determine the likelihood of particular word combinations and generate the word co-occurrence matrix. The process of calculating the matrix values may be done in many different ways, and may change over time depending on the needs of the system. The matrix may be normalized, for example, by using various methods such as term frequency-inverse document frequency ("TF-IDF") normalization or latent semantic analysis. FIG. 8 demonstrates exemplary normalized matrix (or surprisingness) values for various combinations of words with the terms locksmith or locksmiths.

The server may generate surprisingness values based on the matrix. For example, a particular business listing may include the title "Locksmith Restaurant." The server may access the normalized matrix to determine the likelihood of this combination of words. In one example, the normalized matrix may provide values ranging from zero to 1, where 1 may be considered very surprising and zero not surprising. Thus, the surprisingness value for "Locksmith Restaurant" (which is likely a more surprising than not combination) would be greater than zero. In another example, a particular business listing may include the title "Burger Restaurant," a presumably much less surprising combination than "Locksmith Restaurant." Thus, the surprisingness value for "Burger Restaurant" may be less than the surprisingness value for "Locksmith Restaurant" or closer to zero. It will be understood that other scales and values may be used, and the scales themselves may be reverse (where a higher value denotes a less surprising combination).

The server may use surprisingness values to find businesses that are hijacked by spammers. In one example, the server may examine a particular business title and determine a surprisingness value based on the word co-occurrence matrix. The surprisingness value may be compared to a threshold value to determine whether the business title is legitimate. For example, if the surprisingness value is based on the normalized matrix, where all values are between 0 and 1, the threshold value may be a number "X" between 0 and 1. Thus, a business title with a surprisingness value greater than or equal to X may be considered surprising or very likely to be a fraudulent or "keyword stuffed" business title submitted by a hijacker.

It will be understood that the threshold values described above and below are merely exemplary. The threshold value may be determined using various methods and thus may be significantly higher or lower than the examples provided. For example, the threshold value may be determined based on trial and error, or by human examination or hand-tuning of the value.

In another example, for a number of business titles, "N", "K" title may be pre-determined to be hijacked. A subset of the K titles may include word pairs with a surprisingness value above the threshold X. A value "A" represents the number of titles above the threshold X. If X=1, then none of the titles (K or N) will be above the threshold and A=0. If X=0, all K titles will have pairs above this threshold and A=N, however, this includes all of the good titles, (N−K) or "F." For any threshold value X, F must be kept low in order to reduce the number of incorrectly identified titles) but also maximize A (to identify as many surprising titles as possible). Thus, X may be determined by calculating a maximum value of A/F. For example, A/F may be calculated for all values of X between 0 and 1 in small increments, such as 0.1. The X which results in the greatest A/F value may be assigned as the threshold value.

In yet another example, the threshold may be determined by using a histogram of the number of word pairs versus the surprisingess values. A function may be fit to the histogram and the second derivative taken. If there exists a point where the second derivative moves from negative to positive, this point may be assigned as the threshold value.

Returning to the example above, if the words in a business title include "locksmith" and "restaurant", this combination may be highly surprising to find in business title. Thus, more likely than not, this combination is not a legitimate business title. Accordingly, if a title includes "locksmith" along with "restaurant," it would have relatively high surprisingness value, such as 0.88. If the threshold value is 0.8, this combination is above the threshold value and thus, the server may conclude with high confidence that this title was supplied by a hijacker. In another example, the combination of "burgers" and "restaurant" in a title likely to be much more typical, as opposed to surprising. Accordingly, this combination may result in a very low surprisingness value, such as 0.1, below the threshold value of 0.8. Thus, the sever may conclude with high confidence that the title "Burger Restaurant" corresponds to a legitimate business listing.

Figure 3:
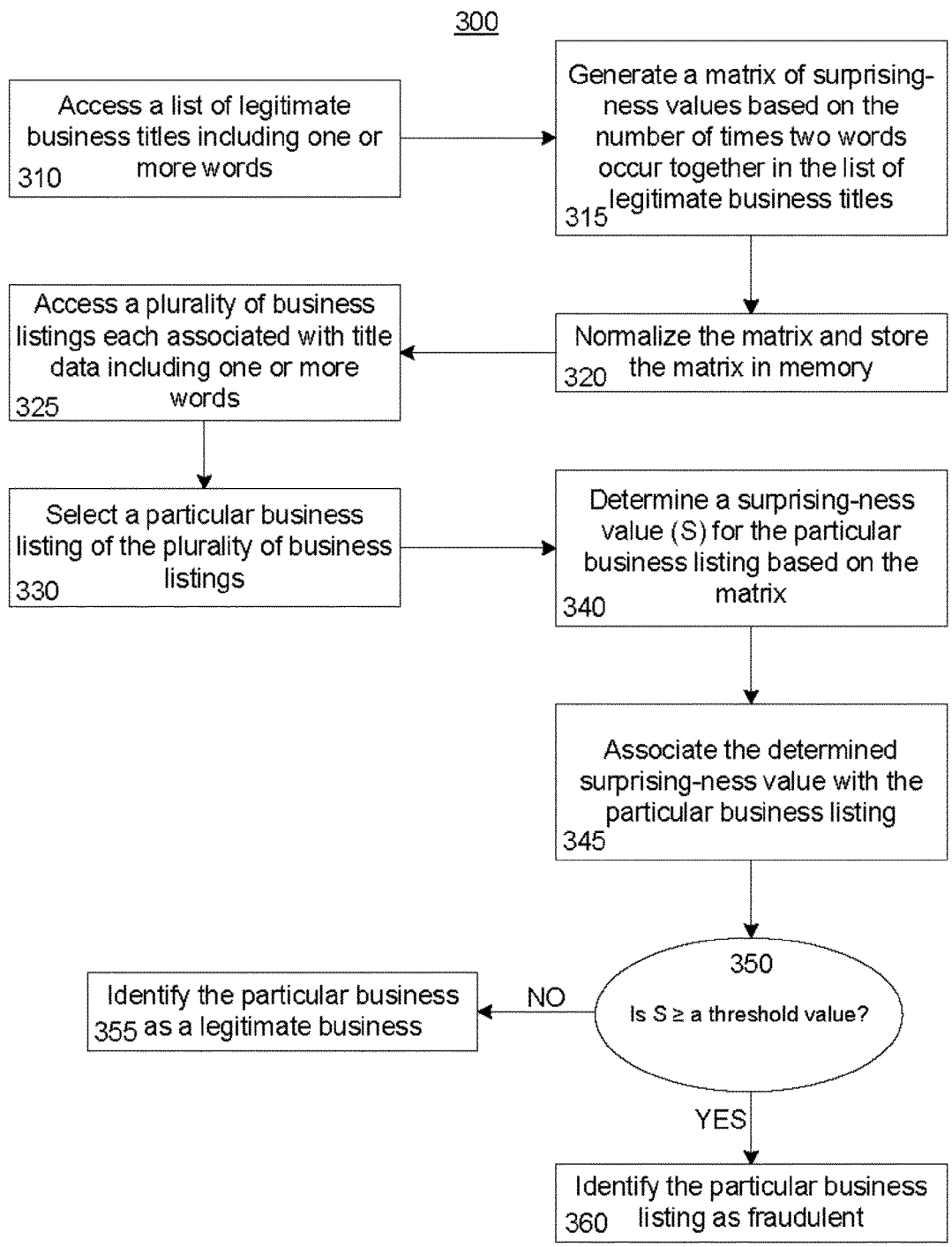
FIG. 3 is a flow diagram in accordance with an aspect of the invention.

Process 300 of FIG. 3 is an exemplary diagram of one of the embodiments described above. The server accesses a list of legitimate business titles including one or more words at block 310. The server generates a matrix of surprisingness values based on the number of times various combinations of two or more words occur together in the titles at block 315. The server normalizes the matrix and stores it at block 320. The server the accesses a plurality of business listings where each listing is associated with title data including one or more words at block 325. The server selects a particular business listing from the plurality of business listings at and determines a surprisingness value(s) for the particular business listing based on the matrix at blocks 330 and 340, respectively. The server associates the determined surprisingness value with the particular business listing at block 345. The server may also compare the surprisingness value to a threshold value to determine whether the business listing is a legitimate listing at block 350. If the surprisingness value is less than the threshold value, the server may identify the particular business listing as a legitimate business listing at block 355, whereas, if the surprisingness value is greater than or equal to the threshold value, the server may identify the particular business listing as fraudulent, as shown at block 360.

In another example, rather than examining a single title, the server may access the entity information and identify multiple titles for a particular business. The particular business may or may not be a known legitimate business of the known legitimate business title list. The server may calculate the surprisingness value for each title and determine an average surprisingness value for all of the titles. If surprisingness value for any of the businesses is greater than the average surprisingness value for each of the titles by a given threshold amount, for example, the title may be a designated as a fraudulent tile, or rather, "keyword stuffed" as described above. The threshold value may be determined, for example, by using one of the methods described above. Alternatively, no threshold value may be used, and the surprisingness value may be used to rank search results. For example, a high surprisingness value may indicate that a search results is less reliable or relevant to the search terms, and thus may be used to place a search result (possibly fraudulent business listing) towards the bottom of a list of search results.

Figure 4:
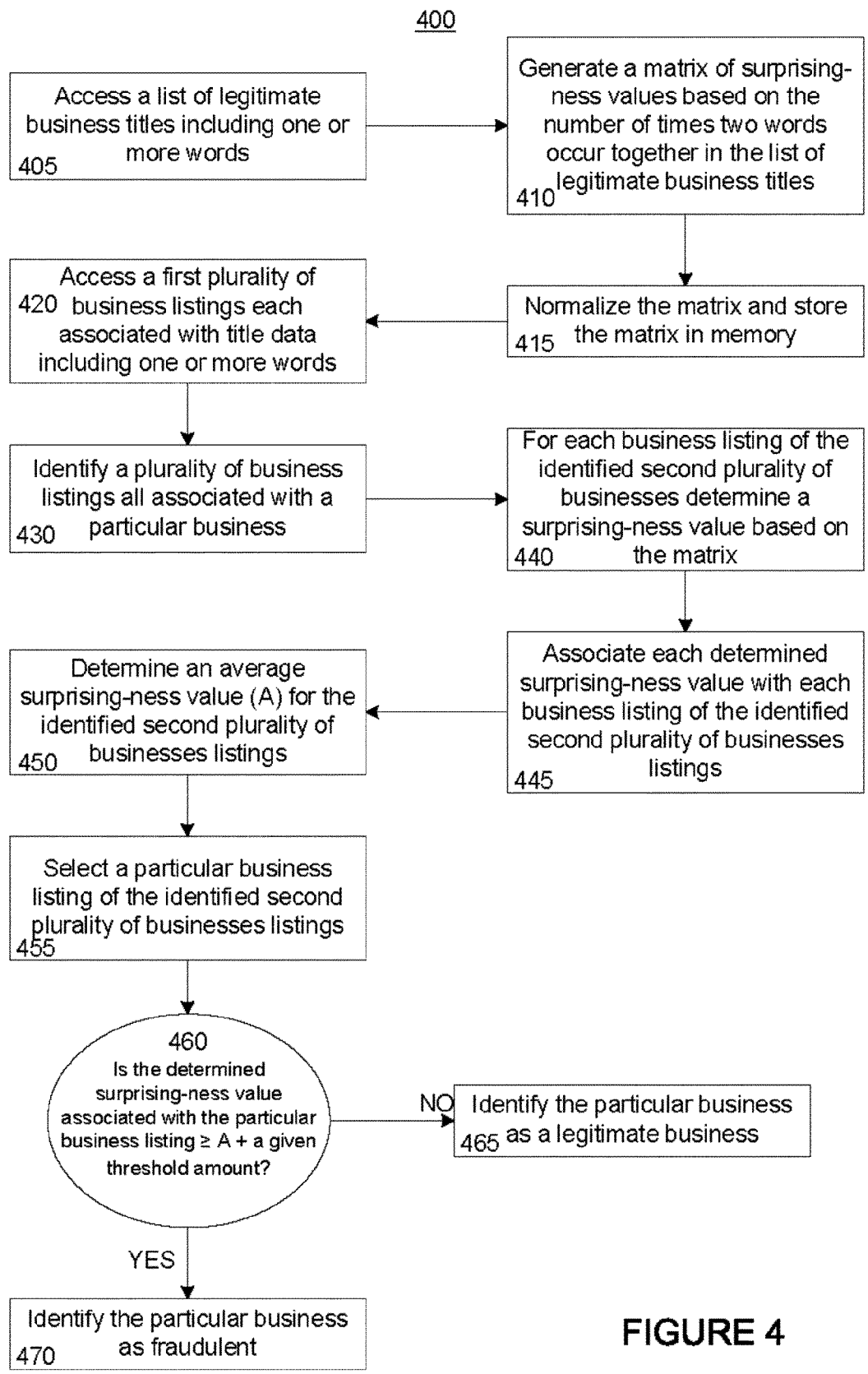
FIG. 4 is a flow diagram in accordance with an aspect of the invention.

Process 400 of FIG. 4 is an exemplary diagram of an embodiment where the server identifies all titles for a particular business. Similar to process 300, the server accesses a list of legitimate business titles including one or more words at block 405. The server generates a matrix of surprisingness values based on the number of times various combinations of two or more words occur together in the titles at block 410. The server normalizes the matrix and stores it at block 415. The server accesses a first plurality of business listings where each listing is associated with title data including one or more words at block 420. The server then identifies a second plurality of business listing each for a particular business (that is, each business listing is associated with the same business) at block 430.

For each business listing of the identified second plurality of businesses, the server determines a surprisingness value based on the matrix at block 440. The server also associates each determined surprisingness value with the respective business listing of the identified second plurality of business listings at block 445. Next, the server then determines an average surprisingness value (A) for the identified second plurality of business listings at block 450. The server selects a particular business listing of the identified second plurality of business listings at block 455 and compares the surprisingness value associated with the particular business listing to the average surprisingness value at block 460.

If the surprisingness value is less than the average surprisingness value plus a given threshold, the server may identify the particular business listing as a legitimate business listing as shown in block 465. If the surprisingness value is greater than or equal to the average surprisingness value plus a given threshold, the server may identify the particular business listing as fraudulent as shown in block 470.

The calculation of a surprisingness value in order to determine whether a business title is fraudulent may be performed periodically (for example, once a day, biweekly, or weekly) or on demand in response to a search request from a client device. For example, once the server calculates a surprisingness value (see, for example, FIGS. 3 and 4), the server may associate the surprisingness value with the business listing. This association may be used to automatically withhold the business listing from all search result lists. Or, in another example, where the server identifies the business listing in a list of search results, such as in response to a search query from the client device, the server may compare the associated surprisingness value to a threshold value. If the server determines that the surprisingness value indicates that the business listing is fraudulent based on the comparison, the server may withhold the business listing from a list of search results transmitted to the client device for display.

In yet another example, once the server determines that a particular business listing is fraudulent (see, for example, FIGS. 3 and 4), the server may include the particular business listing in a list of fraudulent business listings. Where the server identifies the business listing in a list of search results, such as in response to a search query, the server may review the list of fraudulent business listings to determine if the business listing has been identified as fraudulent. If so, the server may withhold the business listing from a list of search results.

As noted above, the server may also calculate the surprisingness value in response to a search request from a client device. For example, the server may receive a search request and identify search results. For any business listings included in the search results, the server may determine a surprisingness value based on the matrix. The server may then compare the surprisingness values to the threshold value (or the average surprisingness value among the listings for the same business) to determine whether each business listing included in the identified search results is fraudulent. Again, if the business listing is determined to be fraudulent, the server may withhold the business listing from the identified list of search results transmitted to the client device.

Figure 5:
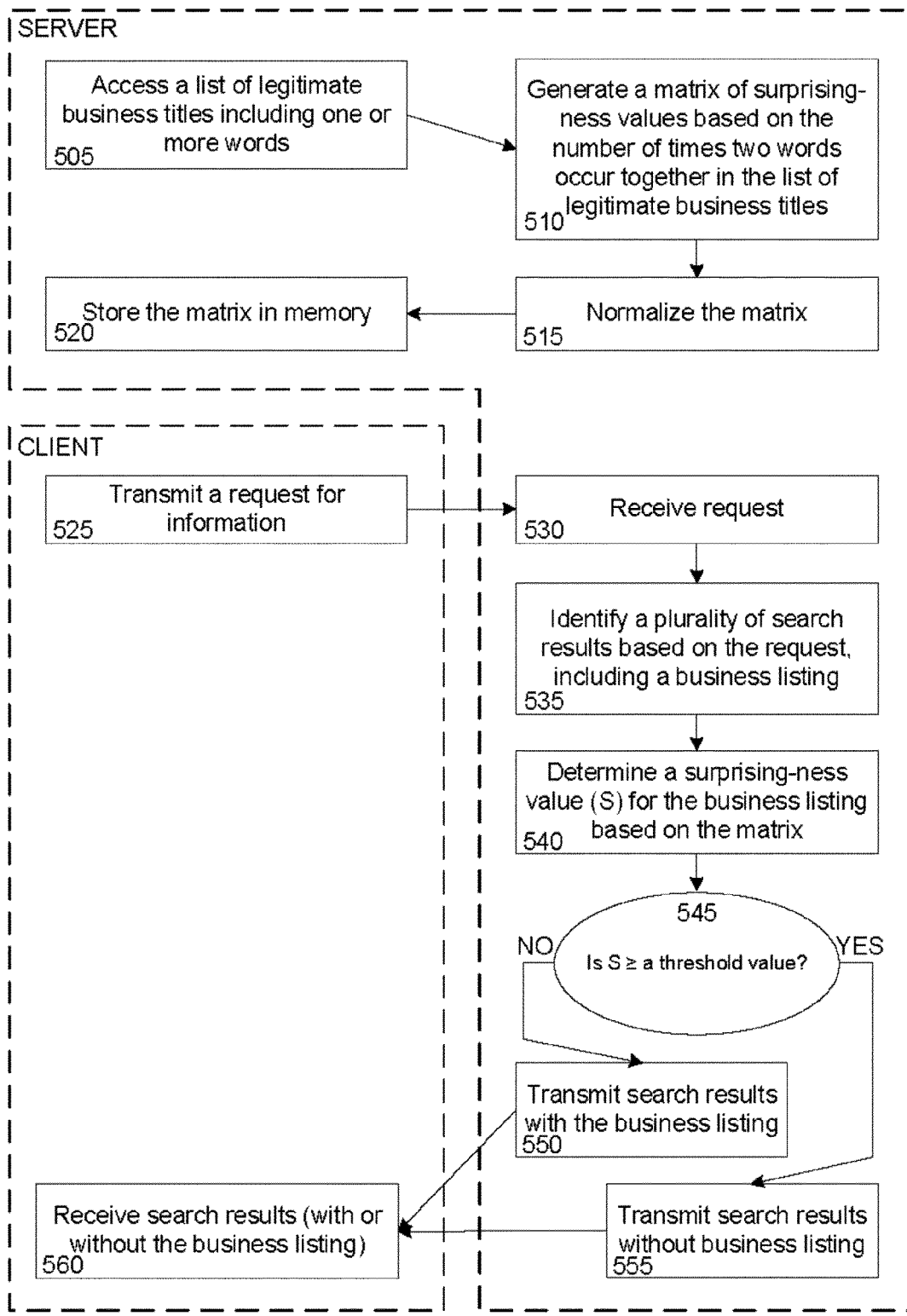
FIG. 5 is a flow diagram in accordance with an aspect of the invention.

Process 500 of FIG. 5 depicts one embodiment of the search request process described above. Again, similar to processes 300 and 400, the server accesses a list of legitimate business titles including one or more words at block 505. The server generates a matrix of surprisingness values based on the number of times various combinations of two or more words occur together in the titles at block 510. The server normalizes the matrix and stores it at blocks 515 and 520, respectively. A client transmits a request for information to the server at block 525, which is received by the server at block 530. The server then identifies a plurality of search results based on the request at block 535. The search results include a business listing. The server determines a surprisingness value(s) for the business listing based on the matrix and compares this value to a threshold value at block 540. If, at block 545, the surprisingness value is less than the threshold value, the server transmits the search results, including the business listing as shown in block 550. If the surprisingness value is greater than or equal to the threshold value, the server may transmit the search results without the business listing as shown in block 555. The client device then receives the transmitted results (with or without the business listing) at block 560. If the identified search results include multiple business listings, steps 550, 555, and 560 may be repeated for each of the additional business listings and/or combined such that only one set of search results is transmitted to the client device.

Figure 6:
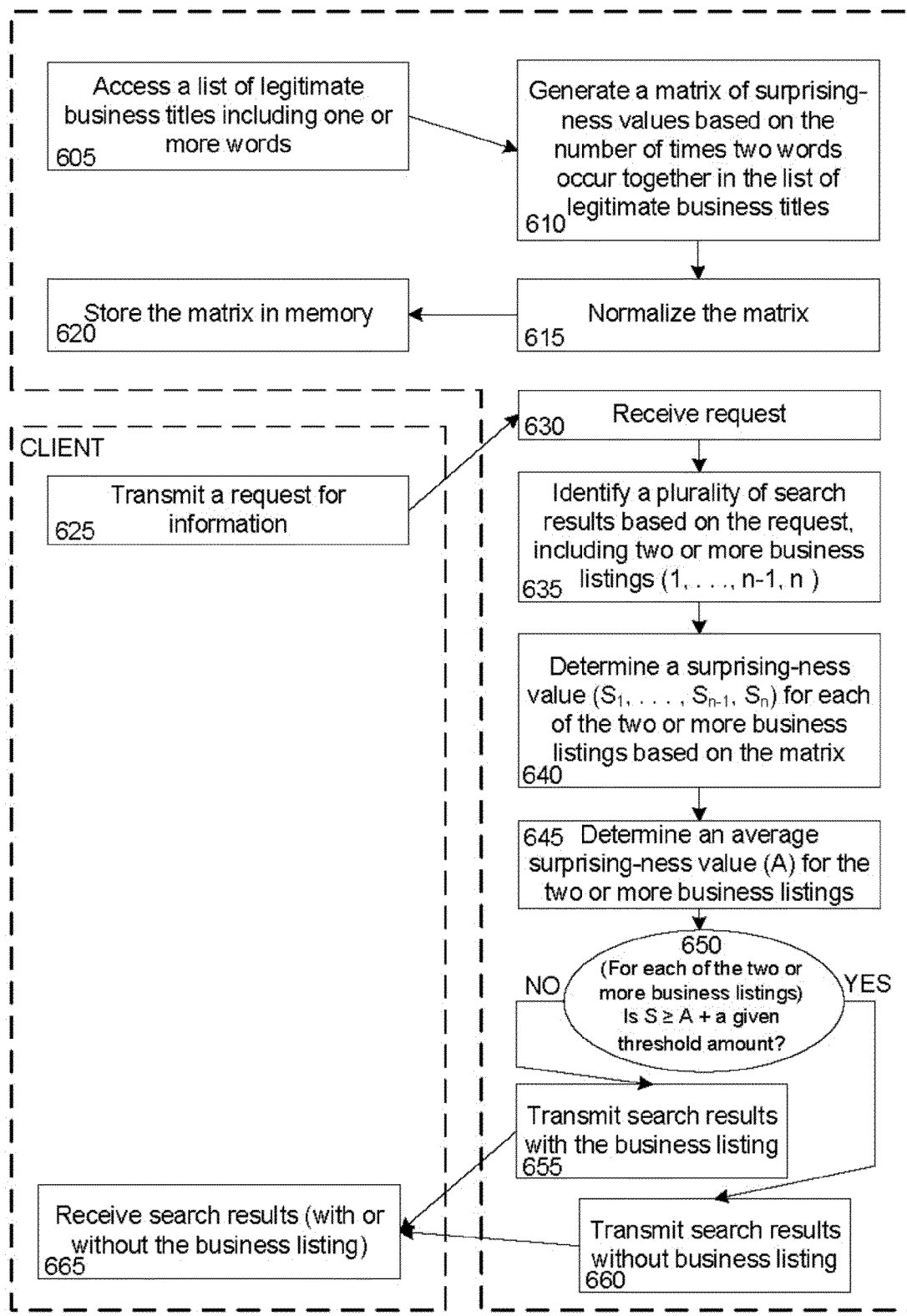
FIG. 6 is a flow diagram in accordance with an aspect of the invention.

Process 600 of FIG. 6 depicts an embodiment of the search request process described above. Again, similar to processes 300, 400, and 500 the server accesses a list the server accesses a list of legitimate business titles including one or more words at block 605. The server generates a matrix of surprisingness values based on the number of times various combinations of two or more words occur together in the titles at block 610. The server normalizes the matrix and stores it at blocks 615 and 620, respectively. A client transmits a request for information to the server at block 625, which is received by the server at block 630. The server then identifies a plurality of search results based on the request at block 635. The search results in the example include two or more business listings (1, 2, . . . , n) for a particular business. The server determines a surprisingness value ($S_1, S_2, \ldots, S_n$) for each of the two or more business listing based on the matrix at block 640.

Next, the server determines an average surprisingness value for the two or more business listings at block 645. The server then compares the average surprisingness value (A) plus a given threshold amount to the surprisingness value for each of the two or more business listings at block 650. If the surprisingness value associated with a particular one of the two or more business listings is less than the average surprisingness value plus the given threshold, the server transmits the search results, including the particular one of the two or more business listing as shown in block 655. If the surprisingness value associated with a particular one of the two or more business listings is greater than or equal to the average surprisingness value plus the given threshold amount, the server may transmit the search results without that particular one of the two or more business listing as shown in block 660. The client device then receives the transmitted results (with or without the particular business listing) at block 665. Again, steps 655, 660, and 665 may be repeated and/or combined as needed for the remaining two or more business listings such that only one list of search results is transmitted to the client device.

Figure 9:
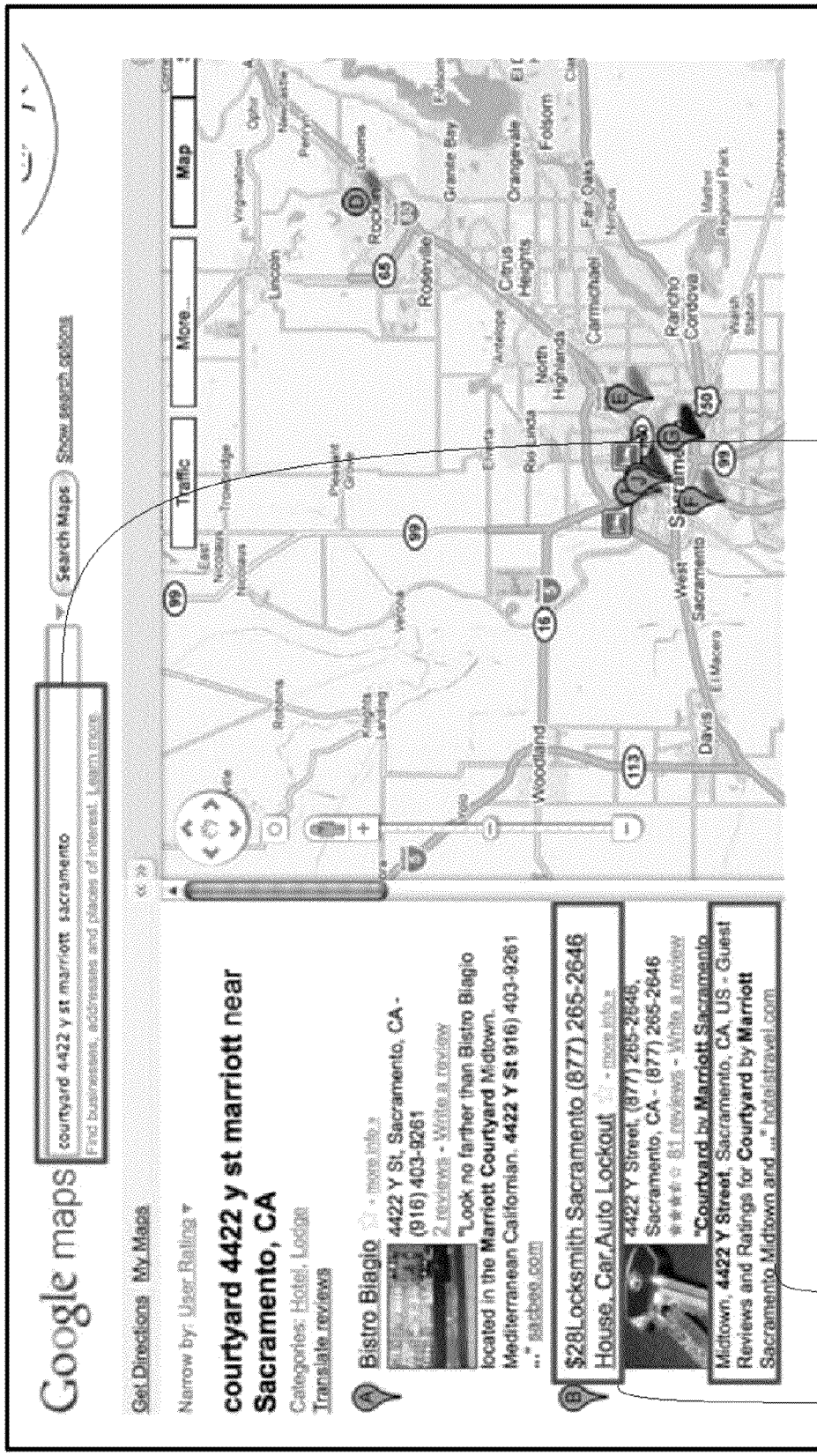
FIG. 9 is an exemplary screen shot demonstrating a keyword-stuffed business listing.

While the examples above describe calculating a matrix based on business titles and generating a surprisingness score for business titles, other types of information may also be used. For example, other information included in a business's listing such as descriptive information or category information may be used to determine whether a combination of words between these types of information is surprising, see for example, FIG. 9.

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A computer-implemented method of determining whether a business listing is legitimate, the method comprising:
    accessing, by a processor, a list of legitimate business titles, each legitimate business title including two or more words;
    generating, by a processor, a matrix of surprisingness values, where each surprisingness value indicates a likelihood of a word appearing in a legitimate business title, by:
        examining each legitimate business title to identify pairs of words occurring in that title,
        adding a count value to the matrix for each pair of words identified, such that the matrix includes a plurality of count values for different pairs of words occurring in the legitimate business titles, and
        normalizing the plurality of count values for the matrix to generate the matrix of surprisingness values, where each surprisingness value of the matrix of surprisingness values indicates how likely a pair of words are to appear in a legitimate business title;
    storing the matrix of surprisingness values in memory;
    accessing a plurality of business listings each associated with title data including two or more words;
    selecting a particular business listing of the plurality of business listings;
    determining a surprisingness value for the title included in the particular business listing based on the matrix of surprisingness values stored in the memory; and
    determining whether the particular business listing is legitimate based on whether the surprisingness value for the title included in the particular business listing is greater than a threshold value.

2. The method of claim 1, further comprising associating the surprisingness value for the title included in the particular business listing with the particular business listing.

3. The method of claim 1, further comprising determining that the particular business listing is fraudulent when the surprisingness value for the title included in the particular business listing does not satisfy the threshold value.

4. The method of claim 1, further comprising:
    accessing a second plurality of business titles having a total number N, where a number K represents the total number of business titles of the second plurality of business titles that are pre-determined to be fraudulent;
    determining a surprisingness value for each business title of the second plurality of business titles;
    selecting the threshold in order to maximize a fraction A/(N−K), where A represents a number of business listings of the second plurality of business titles having a surprisingness value above the threshold value.

5. The method of claim 1, wherein normalizing the matrix includes adjusting the values of the matrix to a scale of 0 to 1, where 1 is a maximum surprisingness value for two words to occur together in a business title and 0 is a minimum surprisingness value for two words to occur together in a business title.

6. A computer-implemented method of determining whether a business listing is legitimate, the method comprising:
    accessing, by a processor, a list of legitimate business titles, each legitimate business title including one or more words;
    generating a matrix of surprisingness values, where each surprisingness value indicates a likelihood of a word appearing in a legitimate business title, by:
        examining each legitimate business title to identify pairs of words occurring in that title,
        adding a count value to the matrix for each pair of words identified, such that the matrix includes a plurality of count values for different pairs of words occurring in the legitimate business titles, and
        normalizing the plurality of count values for the matrix to generate the matrix of surprisingness values, where each surprisingness value of the matrix of surprisingness values indicates how likely a pair of words are to appear in a legitimate business title;
    storing the matrix of surprisingness values in memory;
    accessing a first plurality of business listings each associated with title data including two or more words;
    identifying, from the first plurality of business listings, a second plurality of business listings all corresponding to one particular business;
    for each business listing of the identified second plurality of business listings, determining a surprisingness value indicative of the surprisingness of the title included in the particular business listing based on the stored matrix of surprisingness values;
    determining an average surprisingness value for the identified second plurality of business listings based on the stored matrix of surprisingness values;
    selecting a particular business listing of the identified second plurality of business listings; and
    determining whether the particular business listing is legitimate based on whether the surprisingness value for the particular business listing is greater than the average surprisingness value plus a threshold value.

7. The method of claim 6, further comprising normalizing the matrix of surprisingness values before determining the surprisingness value for each business listing of the identified second plurality of business listings.

8. The method of claim 6, further comprising associating each the surprisingness value with each business listing of the identified second plurality of business listings.

9. The method of claim 6, further comprising determining that the particular business listing is fraudulent when the surprisingness value for the particular business listing is less than or equal to the average surprisingness value plus a threshold value.

10. The method of claim 6, further comprising determining whether the particular business listing is legitimate when the surprisingness value for the particular business listing is greater than the average surprisingness value plus the threshold value.

11. A computer-implemented method of providing search results, the method comprising:
    accessing, by a processor, a list of legitimate business titles, each legitimate business title including one or more words;
    generating a matrix of surprisingness values, where each surprisingness value indicates a likelihood of a word appearing in a legitimate business title, by:
        examining each legitimate business title to identify pairs of words occurring in that title,
        adding a count value to the matrix for each pair of words identified, such that the matrix includes a plurality of count values for different pairs of words occurring in the legitimate business titles, and
        normalizing the plurality of count values for the matrix to generate the matrix of surprisingness values, where each surprisingness value of the matrix of surprisingness values indicates how likely a pair of words are to appear in a legitimate business title,
    receiving a request for information from a client device;
    identifying a business listing having a title of two or more words as a search result responsive to the request for information;
    determining a surprisingness value for the business listing based on the two or more words of the title of the business listing and the matrix of surprisingness values; and
    transmitting to the client device the business listing when the surprisingness value for the business listing is greater than a threshold value.

12. The method of claim 11, further comprising associating the surprisingness value for the business listing with the business listing.

13. A method of determining whether a business listing is legitimate, the method comprising:
    accessing, by a processor, a list of legitimate business titles, each legitimate business title including one or more words;
    generating a matrix of surprisingness values, where each surprisingness value indicates a likelihood of a word appearing in a legitimate business title, by:
        examining, by the processor, each legitimate business title to identify pairs of words occurring in that title;
        adding, by the processor, a count value to the matrix for each pair of words identified, such that the matrix includes a plurality of count values for different pairs of words occurring in the legitimate business titles;
        normalizing, by a processor, the plurality of count values for the matrix to generate the matrix of surprisingness values, where each surprisingness value of the matrix of surprisingness values indicates how likely a pair of words are to appear in a legitimate business title;
    storing the matrix of surprisingness values in memory;
    receiving a request for information from a client device;
    identifying a plurality of search results including two or more business listings including a title of two or more words;
    for each business listing of the two or more business listings, determine a surprisingness value indicative of the surprisingness of the title included in the particular business listing based on the stored matrix of surprisingness values;
    determining an average surprisingness value for the two or more business listings;
    selecting one business listing of the two or more business listings; and
    determining whether the one business listing is legitimate based on whether the surprisingness value for the one business listing is greater than the average surprisingness value plus a threshold value.

14. The method of claim 13, further comprising transmitting the search results without including the one business listing to the client device when the surprisingness value for the one business listing is less than or equal to the threshold value.

15. The method of claim 13, further comprising transmitting to the client device the plurality of search results including the one business listing when the surprisingness value for the one business listing is greater than the threshold value.

16. The method of claim 15, wherein the business listing includes a second title having two or more words, and the method further comprises:
    determining a first surprisingness value based on the two or more words of the title of the business listing and the matrix of surprisingness values;
    determining a second surprisingness value based on the two or more words of the second title of the business listing and the matrix of surprisingness values; and
    wherein the surprisingness value for the business listing is determined based on the first surprisingness value and the second surprisingness value.

17. A computer comprising:
    memory;
    a processor coupled to the memory, the processor being operable to:
    access a list of legitimate business titles stored in the memory, each legitimate business title including one or more words;
    generate a matrix of surprisingness values, where each surprisingness value indicates a likelihood of a word appearing in a legitimate business title, by:
        examining each legitimate business title to identify pairs of words occurring in that title;
        adding a count value to the matrix for each pair of words identified, such that the matrix includes a plurality of count values for different pairs of words occurring in the legitimate business titles;
        normalizing the plurality of count values for the matrix to generate the matrix of surprisingness values, where each surprisingness value of the matrix of surprisingness values indicates how likely a pair of words are to appear in a legitimate business title;
    store the matrix of surprisingness values in the memory;
    access a plurality of business listings stored in the memory, each business listing of the plurality of business listings associated with title data including one or more words;
    select a particular business listing of the plurality of business listings;
    determine a surprisingness value indicative of the surprisingness of the title included in the particular business listing based on the matrix of surprisingness values stored in the memory; and determine whether the particular business listing is legitimate based on whether the surprisingness value is greater than a threshold value.

18. The computer of claim 17, wherein the processor is further operable to determine that the particular business listing is fraudulent when the surprisingness value does not satisfy the threshold value.

\* \* \* \* \*